(12) United States Patent
Drinkwater et al.

(10) Patent No.: US 10,712,813 B1
(45) Date of Patent: *Jul. 14, 2020

(54) TRACKING CONSTELLATION ASSEMBLY FOR USE IN A VIRTUAL REALITY SYSTEM

(71) Applicant: Facebook Technologies, LLC, Menlo Park, CA (US)

(72) Inventors: Jared I. Drinkwater, Auburn, WA (US); Robin Michael Miller, Redmond, WA (US); Boyd Drew Allin, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/928,121

(22) Filed: Mar. 22, 2018

Related U.S. Application Data

(63) Continuation of application No. 14/991,875, filed on Jan. 8, 2016, now Pat. No. 9,977,494.

(60) Provisional application No. 62/273,422, filed on Dec. 30, 2015.

(51) Int. Cl.
*G06F 3/01* (2006.01)
(52) U.S. Cl.
CPC .............. *G06F 3/012* (2013.01); *G06F 3/017* (2013.01)
(58) Field of Classification Search
USPC .......................................................... 345/8
See application file for complete search history.

(56) References Cited

U.S. PATENT DOCUMENTS

| | | | |
|---|---|---|---|
| 4,518,164 | A | 5/1985 | Hayford, Jr. |
| 4,552,360 | A | 11/1985 | Bromley et al. |
| 5,087,825 | A | 2/1992 | Ingraham |
| 5,181,009 | A | 1/1993 | Perona |
| 5,207,426 | A | 5/1993 | Inoue et al. |
| D341,094 | S | 11/1993 | Austin |
| 5,265,009 | A | 11/1993 | Colavita |
| D350,351 | S | 9/1994 | Nakamura |
| 5,421,590 | A | 6/1995 | Robbins |
| D363,320 | S | 10/1995 | Barthelemy et al. |
| 5,479,163 | A | 12/1995 | Samulewicz |
| D369,754 | S | 5/1996 | Donaldson |

(Continued)

OTHER PUBLICATIONS

Tested, "Hands-On with Sixense STEM VR Motion-Tracking System" accessed and printed from URL <https://www.youtube.com/watch?v=C8z-On6FBTM>, 5 pages.

(Continued)

*Primary Examiner* — Chineyere D Wills-Burns
(74) *Attorney, Agent, or Firm* — FisherBroyles, LLP

(57) ABSTRACT

Technology is provided for a tracking constellation assembly for use in a virtual reality system. The tracking constellation assembly includes a translucent panel having an outward facing surface, and an inward facing surface and a mounting surface each opposite the outward facing surface. The translucent panel is substantially opaque to visible light and translucent to infrared light. The assembly includes a flexible circuit board including first and second opposed surfaces. A spacer interconnects the first surface of the flexible circuit board and the mounting surface of the translucent panel. Infrared light emitting diodes are connected to the flexible circuit board and positioned to direct light through the translucent panel.

20 Claims, 9 Drawing Sheets

(56) References Cited

U.S. PATENT DOCUMENTS

| | | |
|---|---|---|
| 5,551,701 A | 9/1996 | Bouton et al. |
| 5,616,078 A | 4/1997 | Oh |
| 5,645,277 A | 7/1997 | Cheng |
| 5,796,354 A | 8/1998 | Cartabiano et al. |
| 5,982,355 A | 11/1999 | Jaeger et al. |
| D418,174 S | 12/1999 | Jankowski et al. |
| D418,879 S | 1/2000 | Hornsby et al. |
| 6,173,203 B1* | 1/2001 | Barkley ............... A61N 1/3931 607/36 |
| 6,192,253 B1 | 2/2001 | Charlier et al. |
| 6,430,110 B2 | 8/2002 | Baroche |
| D472,972 S | 4/2003 | Anderson |
| 6,544,124 B2 | 4/2003 | Ireland et al. |
| 6,572,108 B1 | 6/2003 | Bristow |
| 6,590,835 B2 | 7/2003 | Farine et al. |
| 6,652,383 B1 | 11/2003 | Sonoda et al. |
| 6,970,157 B2 | 11/2005 | Siddeeq |
| 7,004,469 B2 | 2/2006 | von Goeben |
| 7,106,197 B2 | 9/2006 | Gaiotto et al. |
| 7,331,793 B2 | 2/2008 | Hernandez et al. |
| 7,345,670 B2 | 3/2008 | Armstrong |
| D586,823 S | 2/2009 | Anderson et al. |
| D616,417 S | 5/2010 | Liao |
| 8,064,972 B2 | 11/2011 | McLoone et al. |
| D656,996 S | 4/2012 | Mikhailov et al. |
| 8,188,842 B2 | 5/2012 | Otsuka et al. |
| 8,267,786 B2 | 9/2012 | Ikeda |
| 8,439,753 B2 | 5/2013 | Wakitani et al. |
| 8,795,078 B1 | 8/2014 | Musick, Jr. et al. |
| 8,882,596 B2 | 11/2014 | Shimamura et al. |
| 8,994,643 B2 | 3/2015 | Massie et al. |
| D729,803 S | 5/2015 | Avery |
| 9,141,087 B2 | 9/2015 | Brown et al. |
| 9,386,662 B1 | 7/2016 | Hoddie et al. |
| 9,421,472 B2 | 8/2016 | Buller |
| D772,986 S | 11/2016 | Chen et al. |
| D780,807 S | 3/2017 | Chen et al. |
| 9,678,566 B2 | 6/2017 | Webb et al. |
| D795,959 S | 8/2017 | Chen et al. |
| D800,841 S | 10/2017 | Chen et al. |
| 9,804,693 B2 | 10/2017 | Long |
| D802,055 S | 11/2017 | Chen et al. |
| 9,839,840 B2 | 12/2017 | Long |
| 9,977,494 B2* | 5/2018 | Drinkwater ............ G06F 3/011 |
| 2001/0015718 A1 | 8/2001 | Hinckley et al. |
| 2001/0045938 A1 | 11/2001 | Willner et al. |
| 2002/0072415 A1 | 6/2002 | Kikukawa et al. |
| 2003/0100367 A1 | 5/2003 | Cooke |
| 2004/0124245 A1* | 7/2004 | Kiekhaefer ............ G06K 19/14 235/487 |
| 2004/0222963 A1 | 11/2004 | Guo et al. |
| 2004/0222970 A1 | 11/2004 | Martinez et al. |
| 2005/0248544 A1 | 11/2005 | Adam et al. |
| 2005/0255915 A1 | 11/2005 | Riggs et al. |
| 2006/0287089 A1 | 12/2006 | Addington et al. |
| 2007/0049374 A1 | 3/2007 | Ikeda et al. |
| 2007/0066394 A1 | 3/2007 | Ikeda et al. |
| 2007/0084293 A1 | 4/2007 | Kaiserman et al. |
| 2007/0293318 A1 | 12/2007 | Tetterington et al. |
| 2008/0261693 A1 | 10/2008 | Zalewski |
| 2008/0261695 A1 | 10/2008 | Coe |
| 2009/0005164 A1 | 1/2009 | Chang |
| 2009/0143110 A1 | 6/2009 | Armstrong |
| 2009/0149256 A1 | 6/2009 | Lui |
| 2009/0290345 A1* | 11/2009 | Shaner ................. F21V 19/0035 362/249.01 |
| 2009/0295721 A1 | 12/2009 | Yamamoto et al. |
| 2009/0298590 A1 | 12/2009 | Marks et al. |
| 2010/0009760 A1 | 1/2010 | Shimamura et al. |
| 2010/0085321 A1 | 4/2010 | Pundsack |
| 2010/0118195 A1 | 5/2010 | Eom et al. |
| 2010/0144436 A1 | 6/2010 | Marks et al. |
| 2010/0184513 A1 | 7/2010 | Mukasa et al. |
| 2011/0294579 A1 | 12/2011 | Marks et al. |
| 2012/0088582 A1 | 4/2012 | Wu et al. |
| 2012/0202597 A1 | 8/2012 | Yee et al. |
| 2012/0261551 A1 | 10/2012 | Rogers |
| 2013/0162450 A1 | 6/2013 | Leong et al. |
| 2013/0324254 A1 | 12/2013 | Huang et al. |
| 2013/0328774 A1* | 12/2013 | Chen .................. G06F 3/03543 345/158 |
| 2014/0015813 A1 | 1/2014 | Numaguchi et al. |
| 2014/0141891 A1 | 5/2014 | Georgy |
| 2014/0203953 A1 | 7/2014 | Moser et al. |
| 2014/0228124 A1 | 8/2014 | Plagge et al. |
| 2014/0273546 A1 | 9/2014 | Harmon et al. |
| 2014/0361977 A1* | 12/2014 | Stafford ................. G06F 3/013 345/156 |
| 2014/0362110 A1* | 12/2014 | Stafford ................. G06F 3/013 345/633 |
| 2014/0364212 A1 | 12/2014 | Osman et al. |
| 2014/0378227 A1 | 12/2014 | Lee |
| 2015/0077398 A1 | 3/2015 | Yairi et al. |
| 2015/0094142 A1 | 4/2015 | Stafford |
| 2015/0155445 A1* | 6/2015 | Zhan .................... H01L 33/005 257/88 |
| 2015/0229745 A1* | 8/2015 | De Wind ............. H04M 1/0266 455/575.8 |
| 2015/0234477 A1 | 8/2015 | Abovitz et al. |
| 2015/0253574 A1* | 9/2015 | Thurber ............. G02B 27/0172 359/630 |
| 2015/0258431 A1 | 9/2015 | Strafford et al. |
| 2015/0258432 A1 | 9/2015 | Strafford et al. |
| 2015/0268920 A1 | 9/2015 | Schapiro |
| 2015/0370320 A1* | 12/2015 | Connor ................ A61B 5/6831 345/173 |
| 2016/0351362 A1 | 12/2016 | Tsai et al. |
| 2016/0357249 A1 | 12/2016 | Webb et al. |
| 2016/0357261 A1 | 12/2016 | Bristol et al. |
| 2016/0361637 A1 | 12/2016 | Higgins et al. |
| 2016/0361638 A1 | 12/2016 | Higgins et al. |
| 2016/0363996 A1 | 12/2016 | Higgins et al. |
| 2016/0364910 A1 | 12/2016 | Higgins et al. |
| 2016/0366399 A1* | 12/2016 | Tempel ................ G06T 19/006 |
| 2017/0128828 A1 | 5/2017 | Long |
| 2017/0131767 A1 | 5/2017 | Long |
| 2017/0136351 A1 | 5/2017 | Long |
| 2017/0139481 A1 | 5/2017 | Long |
| 2017/0168303 A1* | 6/2017 | Petrov ................ G02B 27/0176 |
| 2017/0177102 A1 | 6/2017 | Long |
| 2017/0189798 A1 | 7/2017 | Rogoza et al. |
| 2017/0189799 A1 | 7/2017 | Anderson et al. |
| 2017/0189802 A1 | 7/2017 | Rogoza et al. |
| 2017/0192495 A1* | 7/2017 | Drinkwater ............ G06F 3/011 |
| 2017/0192506 A1 | 7/2017 | Andersen et al. |

OTHER PUBLICATIONS

Canadian Examiner's Report in Patent Application No. 163,150 dated Apr. 8, 2016, 7 pages.
Canadian Examiner's Report in Patent Application No. 163,150 dated Nov. 19, 2015, 5 pages.
Canadian Examiner's Report in Patent Application No. 167,456 dated Apr. 8, 2016, 1 page.
Canadian Examiner's Report in Patent Application No. 167,457 dated Apr. 8, 2016, 1 page.
Canadian Examiner's Report in Patent Application No. 167,458 dated Apr. 8, 2016, 1 page.
First Examination Report in Indian Patent Application No. 278272 dated Mar. 18, 2016, 2 pages.
First Examination Report in Indian Patent Application No. 278273 dated Mar. 18, 2016, 2 pages.
First Examination Report in Indian Patent Application No. 278274 dated Mar. 14, 2016, 2 pages.
First Examination Report in Indian Patent Application No. 278275 dated Mar. 28, 2016, 2 pages.
Notice of Allowance dated Jun. 29, 2016, for U.S. Appl. No. 29/529,915 by Chen, Y., et al., filed Jun. 11, 2015, 7 pages.
Restriction Requirement dated Apr. 8, 2016, for U.S. Appl. No. 29/529,915 by Chen, Y., et al., filed Jun. 11, 2015, 7 pages.

(56) References Cited

OTHER PUBLICATIONS

U.S. Appl. No. 29/529,915 by Chen, Y., et al., filed Jun. 11, 2015, 54 pages.
U.S. Appl. No. 29/571,025 by Chen, Y., et al., filed Jul. 13, 2016, 65 pages.
U.S. Appl. No. 29/571,027 by Chen, Y., et al., filed Jul. 13, 2016, 66 pages.
U.S. Appl. No. 29/571,030 by Chen, Y., et al., filed Jul. 13, 2016, 66 pages.
Supplemental Notice of Allowability dated Jul. 10, 2017 of U.S. Appl. No. 29/571,030 by Chen, Y., et al., filed Jul. 13, 2016, 6 pages.
Supplemental Notice of Allowability dated Jul. 6, 2017 for U.S. Appl. No. 29/571,025 by Chen, Y., et al., filed Jul. 13, 2016, 6 pages.
Non-Final Office Action dated Jul. 17, 2017 for U.S. Appl. No. 14/939,431 by Long, C., et al., filed Nov. 12, 2015, 17 pages.
Ex Parte Quayle Action mailed May 5, 2017 for U.S. Appl. No. 29/571,027 by Chen, Y., et al., filed Jul. 13, 2016, 10 pages.
Ex Parte Quayle Action mailed May 5, 2017 for U.S. Appl. No. 29/571,030 by Chen, Y., et al., filed Jul. 13, 2016, 10 pages.
Ex Parte Quayle Action mailed May 8, 2017 for U.S. Appl. No. 29/571,025 by Chen, Y., et al., filed Jul. 13, 2016, 10 pages.
Non-Final Office Action dated Apr. 7, 2017 for U.S. Appl. No. 14/975,049 by Long, C., et al., filed Dec. 18, 2015, 18 pages.
Non-Final Office Action dated Mar. 23, 2017 for U.S. Appl. No. 14/934,073 by Long, C., et al., filed Nov. 5, 2015, 18 pages.
Non-Final Office Action dated Mar. 30, 2017 for U.S. Appl. No. 14/939,470 by Long, C., et al., filed Nov. 12, 2015, 13 pages.
Notice of Allowance dated Jun. 15, 2017 of U.S. Appl. No. 29/571,030 by Chen, Y., et al., filed Jul. 13, 2016, 5 pages.
Notice of Allowance dated Jun. 21, 2017 for U.S. Appl. No. 29/571,025 by Chen, Y., et al., filed Jul. 13, 2016, 5 pages.
Notice of Allowance dated Jun. 22, 2017 for U.S. Appl. No. 29/571,027 by Chen, Y., et al., filed Jul. 13, 2016, 5 pages.
U.S. Appl. No. 14/934,073 by Long, C., et al., filed Nov. 5, 2015, 31 pages.
U.S. Appl. No. 14/934,090 by Long, C., et al., filed Nov. 5, 2015, 31 pages.
U.S. Appl. No. 14/939,431 by Long, C., et al., filed Nov. 12, 2015, 31 pages.
U.S. Appl. No. 14/939,470 by Long, C., et al., filed Nov. 12, 2015, 29 pages.
U.S. Appl. No. 14/975,049 by Long, C., et al., filed Dec. 18, 2015, 35 pages.
U.S. Appl. No. 15/172,099 by Rogoza, B., et al., filed Jun. 2, 2016, 38 pages.
U.S. Appl. No. 15/173,474 by Rogoza, B., et al., filed Jun. 3, 2016, 41 pages.
U.S. Appl. No. 15/173,558 by Andersen, B., et al., filed Jun. 3, 2016, 39 pages.
U.S. Appl. No. 15/177,121 by Anderson, B., et al., filed Jun. 2, 2016, 57 pages.
U.S. Appl. No. 29/579,091 by Chen, Y., et al., filed Sep. 27, 2016, 48 pages.
Notice of Allowance dated Sep. 27, 2016, for U.S. Appl. No. 29/529,915 by Chen, Y., et al., filed Jun. 11, 2015, 6 pages.
Non-Final Office Action dated Nov. 1, 2017 for U.S. Appl. No. 15/173,558 by Andersen, B., et al., filed Jun. 3, 2016, 25 pages.
Advisory Action dated Dec. 27, 2017 for U.S. Appl. No. 14/939,470 by Long, C., et al., filed Nov. 12, 2015, 2 pages.
Final Office Action dated Aug. 18, 2017 for U.S. Appl. No. 14/939,470 by Long, C., et al., filed Nov. 12, 2015, 23 pages.
Notice of Allowance dated Sep. 15, 2017 for U.S. Appl. No. 14/975,049 by Long, C. et al., filed Dec. 15, 2015, 13 pages.
U.S. Appl. No. 29/611,924 by Chen, Y., et al., filed Jul. 26, 2017, 71 pages.
"STEM System", accessed and printed from URL: <http://sixense.com/wireless>, 5 pages.
Final Office Action dated Nov. 2, 2017 for U.S. Appl. No. 14/934,073 by Long, C., et al., filed Nov. 5, 2015, 19 pages.
Notice of Allowance dated Oct. 20, 2017 for U.S. Appl. No. 14/934,090 by Long, C., et al., filed Nov. 5, 2015, 19 pages.
Restriction Requirement dated Oct. 12, 2017 for U.S. Appl. No. 29/579,091 by Chen, Y., et al., filed Sep. 27, 2016, 5 pages.
Supplemental Notice of Allowability dated Sep. 29, 2017 for U.S. Appl. No. 29/571,027 by Chen, Y., et al., filed Jul. 13, 2016, 6 pages.

\* cited by examiner

TRACKING CONSTELLATION ASSEMBLY FOR USE IN A VIRTUAL REALITY SYSTEM

CROSS-REFERENCE TO RELATED APPLICATION

This non-provisional patent application is a continuation of U.S. patent application Ser. No. 14/991,875, filed 8 Jan. 2016, and titled "TRACKING CONSTELLATION ASSEMBLY FOR USE IN A VIRTUAL REALITY SYSTEM," which claims the benefit of and priority to U.S. Provisional Patent Application No. 62/273,422, titled TRACKING CONSTELLATION ASSEMBLY FOR USE IN A VIRTUAL REALITY SYSTEM, filed Dec. 30, 2015. Both applications are incorporated herein in their entireties.

TECHNICAL FIELD

This patent application is directed to virtual reality systems and, more specifically, to head-mounted display and controller tracking features.

BACKGROUND

In a virtual reality system, a user typically wears a head-mounted display that presents a selected virtual reality (VR) environment in front of the user's eyes. In some VR systems, a user can manipulate items in the virtual environment with handheld controllers. The head-mounted display and controllers include tracking features comprised of a plurality of tracking lights, for example. The system monitors the movement of the tracking lights with a tracking camera and reproduces the user's head and hand movements in the virtual environment.

BRIEF DESCRIPTION OF THE DRAWINGS

Embodiments of the tracking constellation assemblies introduced herein may be better understood by referring to the following Detailed Description in conjunction with the accompanying drawings, in which like reference numerals indicate identical or functionally similar elements.

Figure 1:
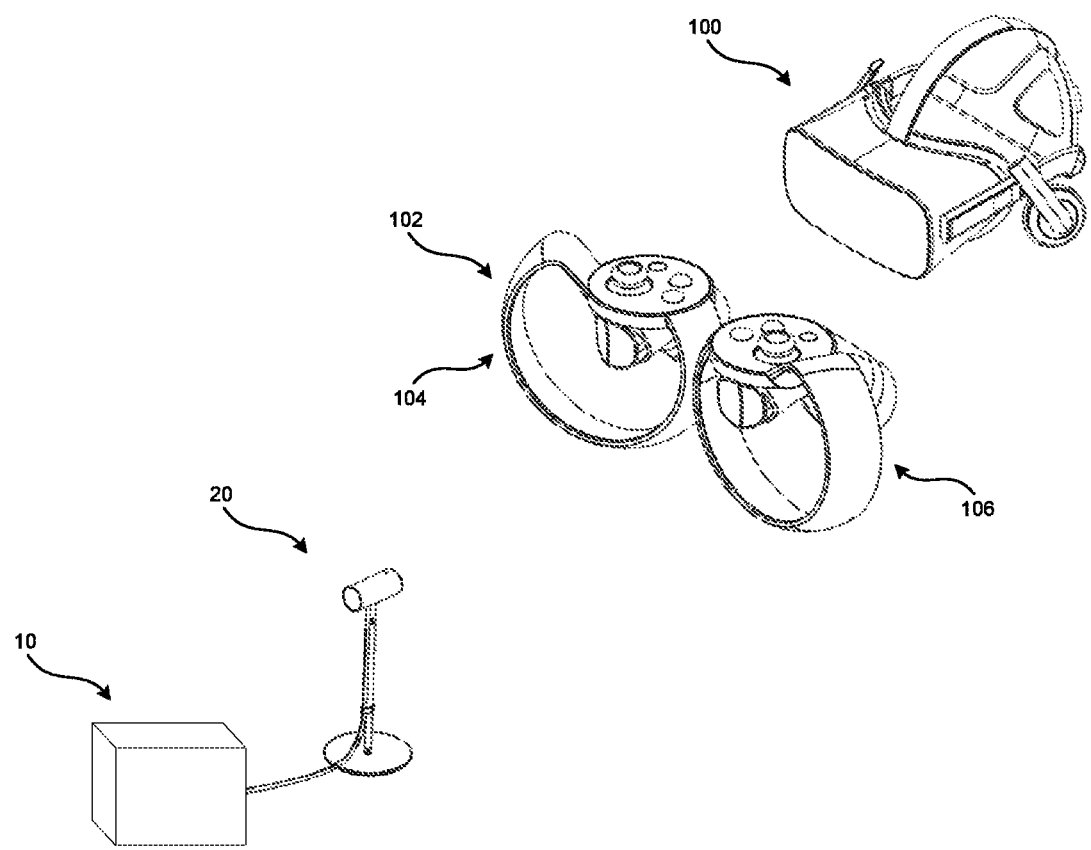
FIG. 1 is an isometric view of a virtual reality system according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A tracking constellation assembly for use in a virtual reality system is disclosed. In an embodiment, the tracking constellation assembly includes a translucent panel having an outward facing surface, and an inward facing surface and a mounting surface each opposite the outward facing surface. The translucent panel is substantially opaque to visible light and translucent to infrared light. The assembly includes a flexible circuit board including first and second opposed surfaces. A spacer interconnects the first surface of the flexible circuit board and the mounting surface of the translucent panel. Infrared light emitting diodes are connected to the flexible circuit board and positioned to direct light through the translucent panel.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates components of a virtual reality (VR) system according to a representative embodiment. The VR system 10 can include a head mounted display 100, a pair of handheld controllers 102, and a tracking camera 20. The pair of handheld controllers 102 includes a right hand controller 104 and a left hand controller 106. The tracking camera 20 is connected to the VR system 10 and is operative to track both the head mounted display 100 and the handheld controllers 102. The system monitors the movement of the head mounted display 100 and the handheld controllers 102 in three-dimensional space relative to the tracking camera 20 in order to substantially reproduce and/or utilize the user's hand and head movements in the virtual environment.

Figure 2:
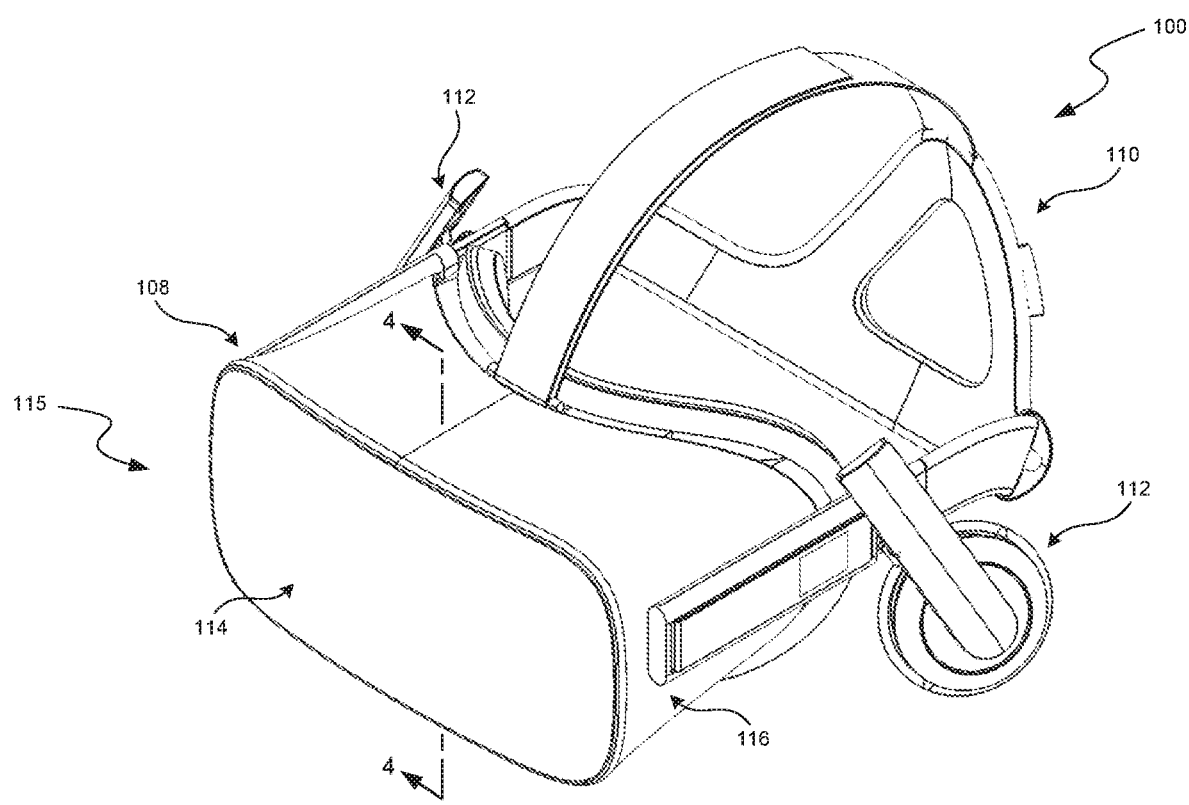
FIG. 2 is an isometric view of the head mounted display shown in FIG. 1.

As shown in FIG. 2, the head mounted display 100 includes a display unit 108 with a strap assembly 110 configured to support the head mounted display 100 on a user's head. In some embodiments, the head mounted display 100 includes audio modules 112 positioned on the left and right sides of the strap assembly 110. The display unit 108 has a constellation system 115 with trackable markers selectively distributed on the display unit 108 and configured to be tracked by the camera 20. The constellation system 115 of the illustrated embodiment includes front tracking constellation assembly 114 and one or more sidewall tracking constellation assemblies 116. As explained more fully below, the tracking constellation assemblies 114 and 116 include a plurality of lights (e.g., light emitting diodes 120) or other trackable markers that can be tracked by the tracking camera 20.

Figure 3:
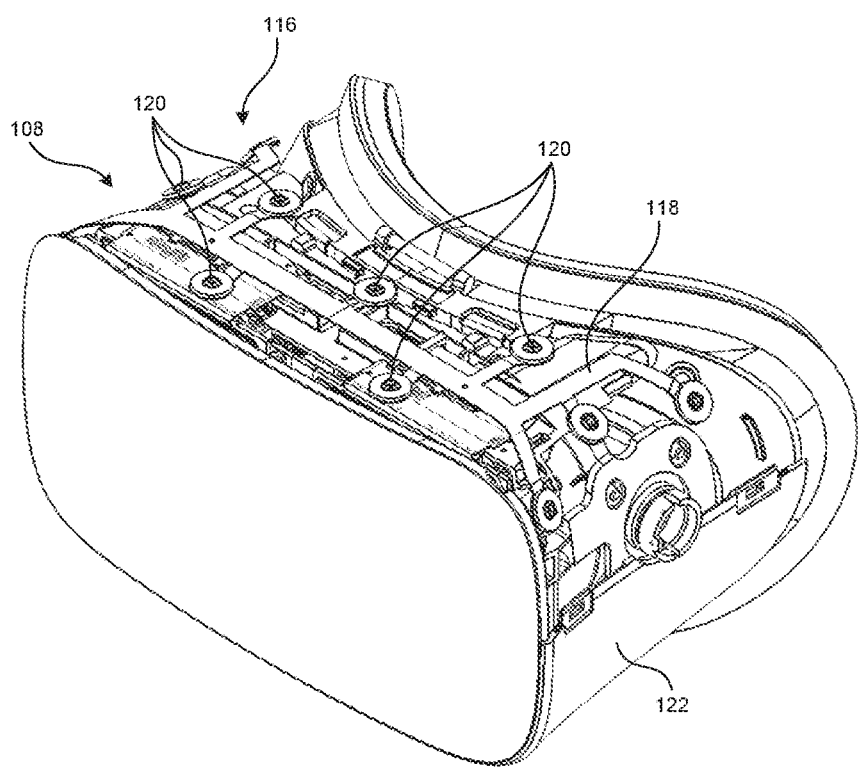
FIG. 3 is an isometric view of the display unit shown in FIG. 2 with various components hidden to show the tracking constellation.

As shown in FIG. 3, the sidewall tracking constellation assembly 116 includes one or more covers 122, one of which has been removed to show the internal constellation components. The covers 122 are positioned to protect and/or at least partially hide the tracking constellation from a user's view and are transparent or translucent relative to the light emitting diodes 120 so the generated light is visible to the tracking camera 20. Covers 122 can comprise a panel substantially opaque to visible light (i.e., light within the spectrum substantially visible to humans) yet translucent to infrared light. In some embodiments, the covers 122 comprise the covers are made of a plastic material substantially opaque to visible light and substantially transparent to light at wavelengths above approximately 750 nm.

Figure 4:
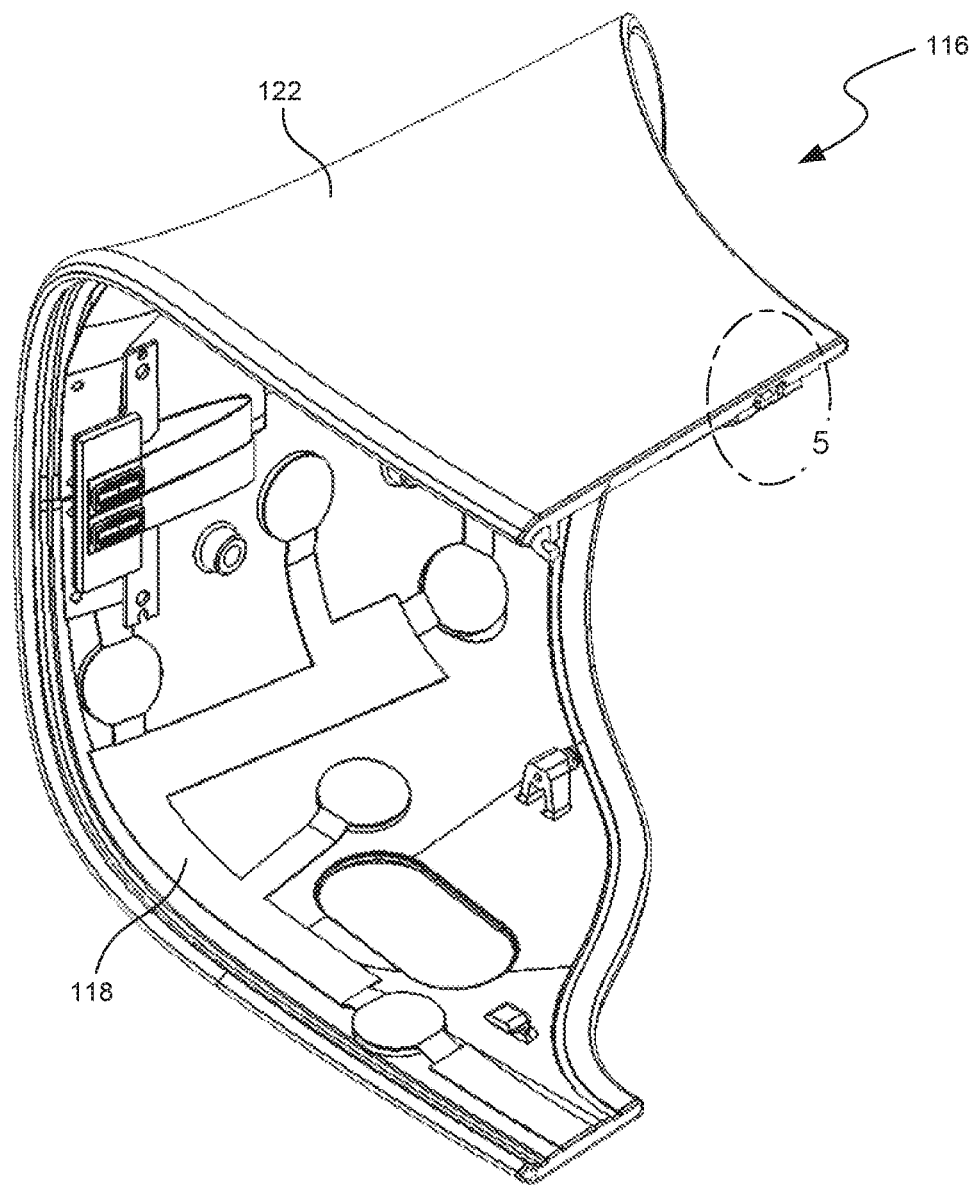
FIG. 4 is a partial, enlarged isometric view in cross-section of the tracking constellation assembly taken about line 4-4 in FIG. 2.

In the illustrated embodiment, the sidewall tracking constellation assembly 116 includes a flexible circuit board 118 and a plurality of light emitting diodes 120 connected to the circuit board and positioned to direct light through the translucent panels 122. With further reference to FIG. 4, the circuit board 118 and light emitting diodes 120 are positioned on the inside surface of the cover 122. The flexible circuit board 118 can follow the contours of the sidewall panel or cover 122 and provides power to the various light emitting diodes 120. In some embodiments, the light emitting diodes (LEDs) are 850 NM infrared LEDs with a 120 degree viewing angle. An example of a suitable infrared LED is part number VSMY3850 available from Vishay®.

Figure 5:
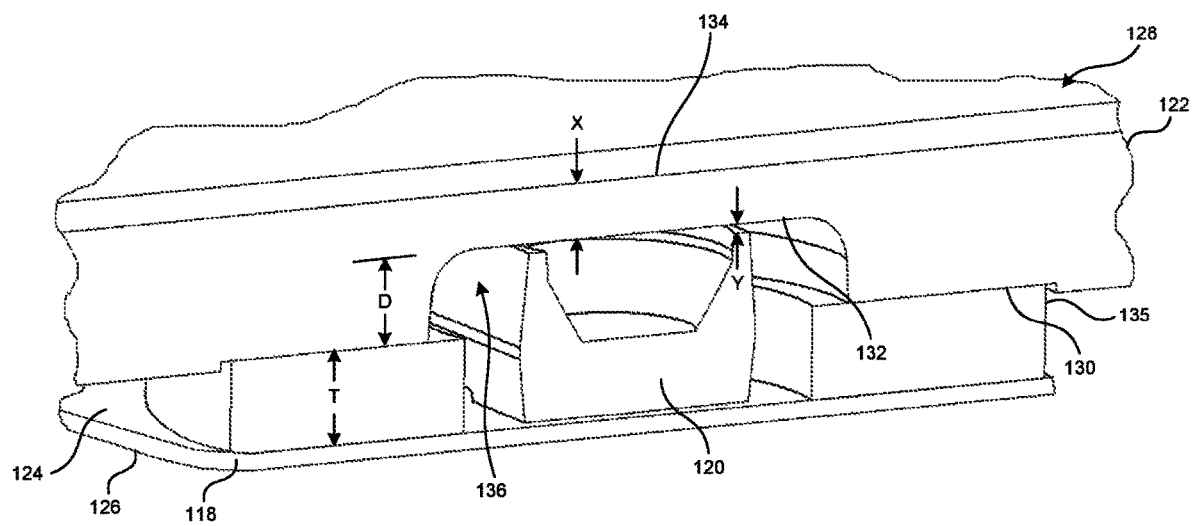
FIG. 5 is an enlarged partial cross-section of the tracking constellation assembly shown in FIG. 4.

As shown in FIG. 5, cover 122 includes an outward facing surface 134 and an inward facing surface 132 and a mounting surface 130. The inward facing surface 132 and mounting surface 130 are opposite the outward facing surface 134. The flexible circuit board 118 includes a first surface 124 and an opposed second surface 126. The flexible circuit board 118 is connected to the mounting surface 130 of cover 122. In some embodiments, a spacer 135 interconnects the first surface 124 of the flexible circuit board 118 and the mounting surface 130 of the cover panel 122. In some embodiments, the spacer 135 comprises double-sided tape in the form of an annular disk. In the depicted embodiment, the light emitting diodes 120 are connected to the flexible circuit board 118 on the first surface 124. In some embodiments, the mounting surface 130 comprises a spot-face formed in the cover panel 122. Cover panel 122 also includes a counterbore 136 formed therein. Accordingly, the inward facing surface 132 comprises a bottom surface of the counterbore 136. In some embodiments, the spacer 135 is integral with the cover panel 122 in the form of a boss into which a counterbore can be formed to receive the light emitting diode 120.

In the illustrated embodiment, the distance between the inward facing surface 132 and the outward facing surface 134 is a dimension X. The light emitting diode 120 is positioned in the counterbore 136 with a distance Y between the inward facing surface 132 and the light emitting diode 120. Dimension X can be adjusted by varying the depth D of the counterbore 136. Also, the dimension Y is adjustable by varying the depth of the counterbore 136 as well as the thickness T of the spacer 135. In at least one embodiment, dimension X is approximately 0.6 mm, dimension Y is approximately 0.083 mm, dimension D is approximately 1.55 mm, and dimension T is approximately 1 mm.

At least a portion of the inward facing surface 132 has a first surface finish and at least a portion of the outward facing surface 134 has a second surface finish rougher than the first surface finish. For example, in at least one embodiment, the inward facing surface 132 has a surface finish of SPI/SPE A2 Polish. In some embodiments, the sidewall tracking constellation assembly 116 further comprises a fabric layer 128 disposed on at least a portion of the outward facing surface 134 of cover panel 122. In at least one embodiment, the fabric layer 128 is adhered to the outward facing surface 134. The above disclosed combination of materials, dimensions, and surface finishes have been found to provide desired light characteristics for tracking by the tracking camera 20. Specifically, in at least one embodiment, the disclosed combination of materials, dimensions, and surface finishes causes the LED 120 to direct light through the translucent panel 122 and project a substantially round point of light from the outward facing surface 134 that is more easily tracked by the tracking camera 20 than an irregular shaped light source.

Figure 6:
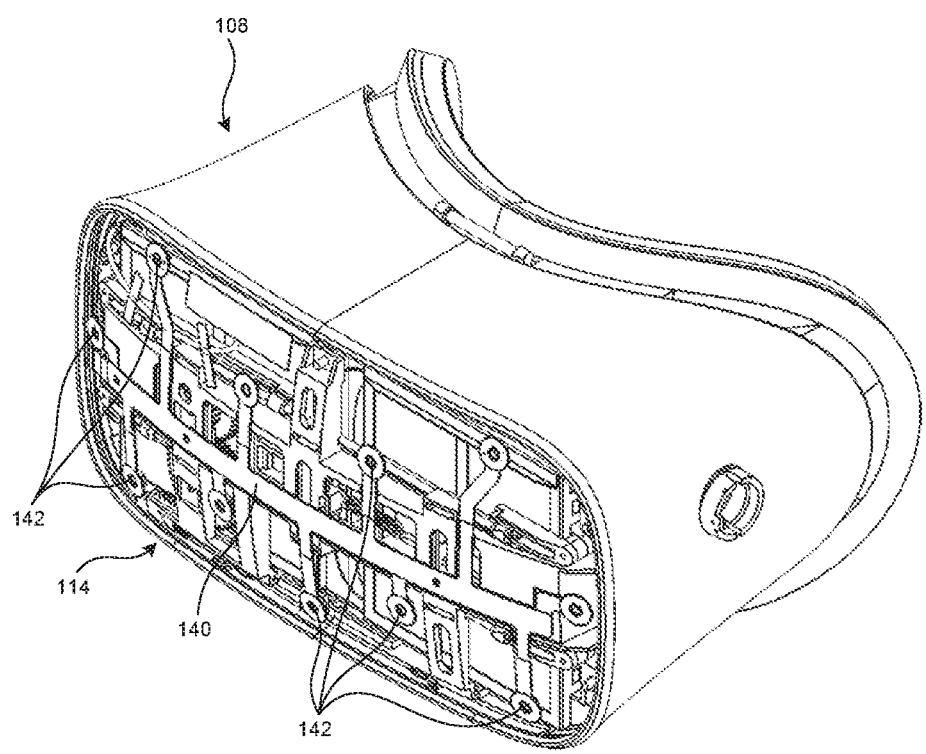
FIG. 6 is an isometric view of the display unit with the front cover removed to illustrate a front tracking constellation.
Figure 7:
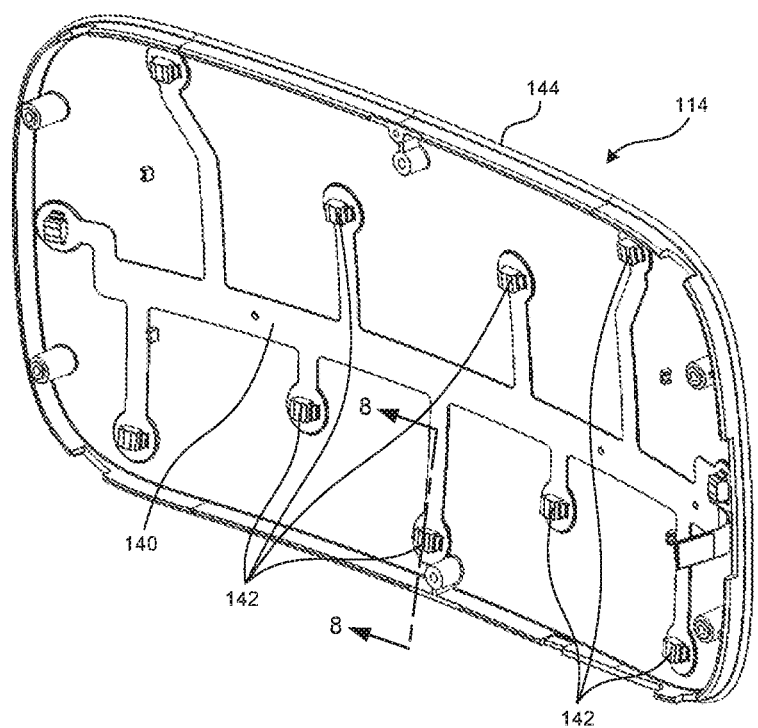
FIG. 7 is an isometric view of the front cover tracking constellation assembly as viewed from behind the cover.

As shown in FIG. 6, the construction of the front panel tracking constellation assembly 114 is similar to the sidewall tracking constellation assembly 116. The front panel tracking constellation assembly 114 also includes a flexible circuit board 140 and a plurality of light emitting diodes 142. With further reference to FIG. 7, the front panel tracking constellation assembly 114 includes a front cover 144 to which the flexible circuit board 140 is attached. However, the light emitting diodes 142 are positioned on the flexible circuit board 140 inboard of the circuit board and cover panel 144 instead of between the circuit board and the panel. An example of another suitable infrared LED is part number SFH 4253 available from OSRAM™. This LED includes reverse gullwing contacts for top down mounting to emit light through the circuit board. In some embodiments, the cover panel 144 is also made of a plastic material substantially opaque to visible light and substantially transparent to light at wavelengths above approximately 750 nm.

Figure 8:
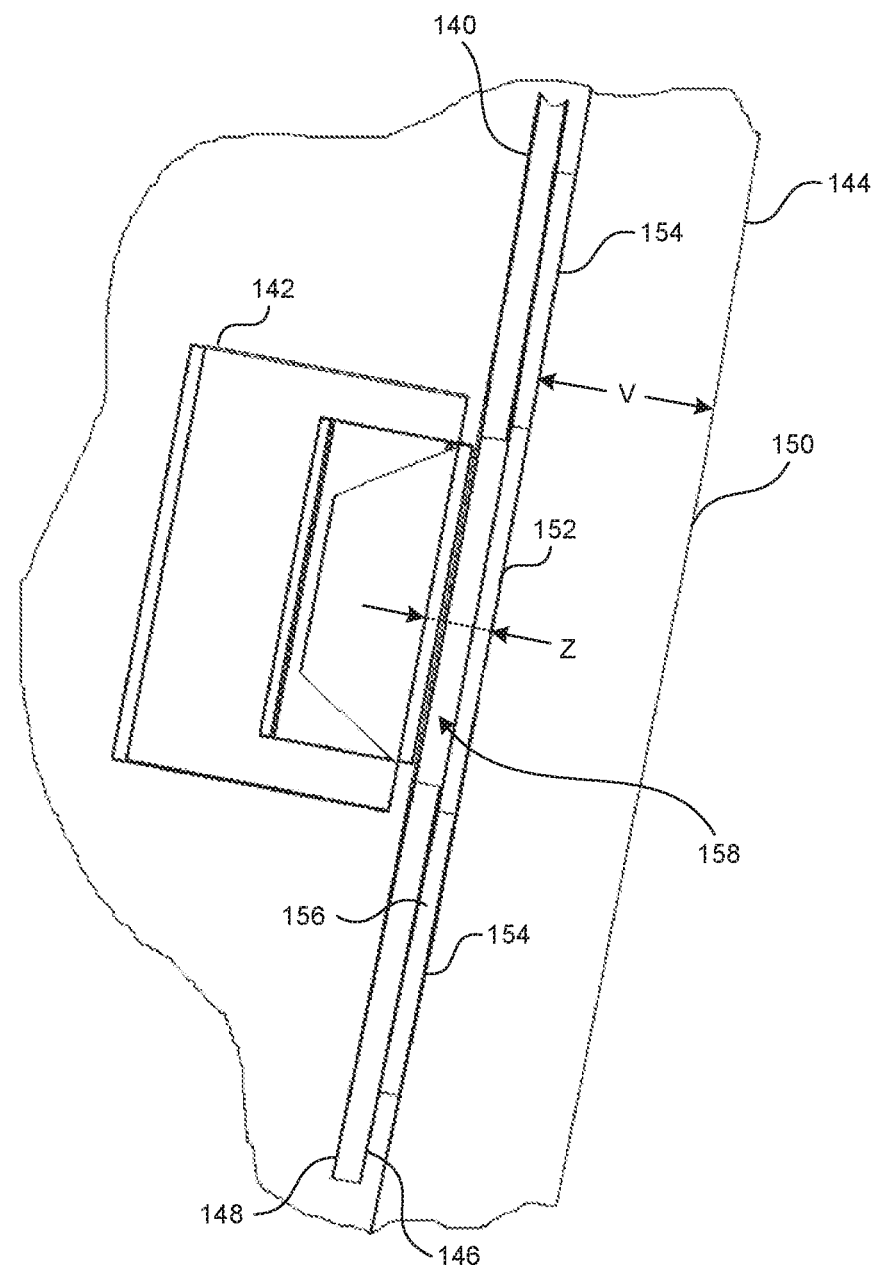
FIG. 8 is an enlarged partial cross-section of the tracking constellation assembly taken about line 8-8 in FIG. 7.

As shown in FIG. 8, the cover panel 144 includes an outward facing surface 150, and a mounting surface 154 and an inward facing surface 152 facing opposite the outward facing surface 150. Flexible circuit board 140 includes a first surface 146 and an opposed second surface 148. Flexible circuit board 140 includes an aperture 158 formed therethrough. The light emitting diode 142 is connected to the second surface 148 of the circuit board and positioned to direct light through the aperture 158 and through the cover panel 144. In this embodiment, the inward facing surface 152 and mounting surface 154 are coplanar. The first surface 146 is mounted to the mounting surface 154 with a layer of double-sided tape 156. The double-sided tape 156 is in the form of an annular ring. In some embodiments, the double-sided tape is approximately 0.05 mm thick. In some embodiments, the flexible circuit board 140 is bonded directly to the mounting surface 154. The light emitting diodes 142 are positioned a distance Z from the inward facing surface 152 and the panel 144 has a thickness V. In at least one embodiment, dimension Z is approximately 0.21 mm and dimension V is approximately 1.25 mm. At least a portion of the inward facing surface 152 has a first surface finish and at least a portion of the outward facing surface 150 has a second surface finish rougher than the first surface finish. In at least one embodiment, the inward facing surface 152 has a surface finish of SPI/SPE A2 Polish. The combination of materials, dimensions, and surface finishes disclosed with respect to the front panel tracking constellation assembly 114 have been found to provide desired light characteristics (e.g., round point of light) for tracking by the tracking camera 20. In particular, in at least one embodiment, the disclosed combination of materials, dimensions, and surface finishes provides provide the desired light characteristics for a panel that does not include a fabric layer as disclosed above with respect to the side cover panels 122.

Figure 9:
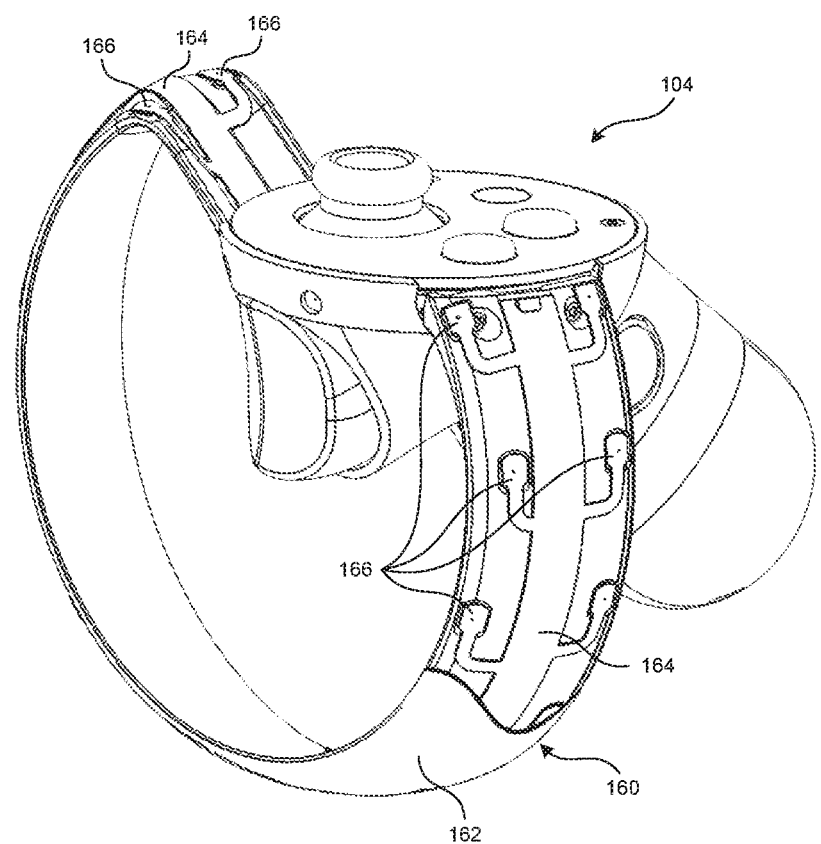
FIG. 9 is an isometric view of a handheld controller with various components hidden to show a tracking constellation therein.

Although the tracking constellation assemblies have been described with respect to the head mounted display, the handheld controllers, such as right hand controller 104, can also include tracking constellation assemblies as shown in FIG. 9. For example, the right hand controller 104 includes a controller tracking constellation assembly 160. The controller tracking constellation assembly 160 includes an outer cover 162 translucent to infrared light and a flexible circuit board 164 positioned under the cover 162. The flexible circuit board 164 supports a plurality of light emitting diodes 166. As with the above described embodiments, the circuit board 164 can be similarly mounted to the cover 162 or the controller itself. In addition, the light emitting diodes 166 can be spaced from the cover as described above and mounted as described above.

Remarks

As presented herein, "transparent" has the meaning of allowing the specular transmission of light allowing light to pass through so that objects behind can be distinctly seen with minimal distortion. And, where "translucent" means that the material, or layers of material, allows light, but not detailed images, to pass through; also known as semi-transparent. Any references to translucent are known to apply to either transparent or semi-translucent embodiments. "Opaque" has the meaning of appearing to block light from passing through the material or layers of material. "Opacity" refers to the degree to which a material is opaque. In other words, opacity refers to a material's transmittance or ability to pass light therethrough.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A tracking constellation assembly for use in a virtual reality system, comprising:
    a cover panel comprising an outward facing surface, an inward facing surface, and a mounting surface, the inward facing surface and the mounting surface each being opposite the outward facing surface, wherein at least a portion of the outward facing surface comprises a first surface finish and at least a portion of the inward facing surface comprises a second surface finish, wherein the first surface finish is different from the second surface finish;
    a flexible circuit board comprising a first surface and an opposed second surface, wherein the first surface is connected to the mounting surface of the cover panel; and
    an array of trackable markers disposed in a particular pattern on the flexible circuit board, wherein at least one trackable marker of the array of trackable markers is configured to emit light that is modified by the first surface finish and the second surface finish of the cover panel and emerges from the outward facing surface for tracking by at least one tracking camera, and wherein the at least one trackable marker is disposed inboard of the cover panel.

2. The tracking constellation assembly of claim 1, wherein the at least one trackable marker comprises at least one light.

3. The tracking constellation assembly of claim 2, wherein the cover panel is substantially opaque to visible light and substantially transparent to light wavelengths to be emitted by the at least one light.

4. The tracking constellation assembly of claim 3, wherein the at least one light comprises at least one infrared light, and wherein the cover panel is substantially transparent to light wavelengths above approximately 750 nm.

5. The tracking constellation assembly of claim 1, wherein the flexible circuit board includes an aperture formed therethrough, and wherein the at least one trackable marker is connected to the second surface of the flexible circuit board and positioned to direct light through the aperture.

6. The tracking constellation assembly of claim 1, wherein:
    the constellation assembly is arranged on a head-mounted-display system that presents a virtual environment to a user; and
    the at least one tracking camera tracks the user's head movements by sensing the light that emerges from the outward facing surface of the constellation assembly.

7. The tracking constellation assembly of claim 1, wherein:
the constellation assembly is arranged on a controller that is configured to be held by a user for controlling a virtual environment presented by the virtual reality system; and
the at least one tracking camera tracks the user's hand movements by sensing the light that is seen to emerge from the outward facing surface of the constellation assembly.

8. The tracking constellation of claim 1, wherein the cover panel is comprises a plastic material.

9. A virtual reality system, comprising:
a head-mounted-display system that presents a virtual environment to a user;
one or more handheld controllers configured to be held by the user's hand for interacting with the virtual environment; and
a tracking constellation assembly arranged on at least one of the head-mounted-display system or the one or more handheld controllers, the tracking constellation assembly including:
a cover panel comprising an outward facing surface, an inward facing surface, and a mounting surface, the inward facing surface and the mounting surface each being opposite the outward facing surface, wherein at least a portion of the outward facing surface comprises a first surface finish and at least a portion of the inward facing surface comprises a second surface finish, wherein the first surface finish is different from the second surface finish;
a flexible circuit board comprising a first surface and an opposed second surface, wherein the first surface is connected to the mounting surface of the cover panel; and
an array of trackable markers disposed in a particular pattern on the flexible circuit board, wherein at least one trackable marker of the array of trackable markers is configured to emit light that is modified by the first surface finish and the second surface finish of the cover panel and emerges from the outward facing surface for tracking by at least one tracking camera, and wherein the at least one trackable marker is disposed inboard of the cover panel.

10. The virtual reality system of claim 9, wherein the at least one trackable marker comprises at least one light.

11. The virtual reality system of claim 10, wherein the cover panel is substantially opaque to visible light and substantially transparent to light wavelengths to be emitted by the at least one light.

12. The virtual reality system of claim 11, wherein the at least one light comprises at least one infrared light, and wherein the cover panel is substantially transparent to light wavelengths above approximately 750 nm.

13. The virtual reality system of claim 9, wherein the flexible circuit board includes an aperture formed therethrough, and wherein the at least one trackable marker is connected to the second surface of the flexible circuit board and positioned to direct light through the aperture.

14. The virtual reality system of claim 9, wherein:
the constellation assembly is arranged on the head-mounted-display system;
the light to be emitted by the at least one trackable marker is configured to be sensed by the at least one tracking camera to track the user's head movements; and
the virtual reality system is configured to use the tracked head movements to at least one of reproduce or utilize the user's head movements in the virtual environment.

15. The virtual reality system of claim 9, wherein:
the constellation assembly is arranged on at least one of the one or more handheld controllers;
the light to be emitted by the at least one trackable marker is configured to be sensed by the at least one tracking camera to track the user's hand movements; and
the virtual reality system is configured to use the tracked hand movements to at least one of reproduce or utilize the user's hand movements in the virtual environment.

16. A method of assembling a tracking constellation assembly for use in a virtual reality system, the method comprising:
providing a cover panel comprising an outward facing surface, an inward facing surface, and a mounting surface, the inward facing surface and the mounting surface each being opposite the outward facing surface, wherein at least a portion of the outward facing surface comprises a first surface finish and at least a portion of the inward facing surface comprises a second surface finish, wherein the first surface finish is different from the second surface finish;
connecting a first surface of a flexible circuit board to the mounting surface of the cover panel, the flexible circuit board comprising the first surface and a second surface opposite the first surface; and
connecting an array of trackable markers arranged in a particular pattern to the flexible circuit board, wherein at least one trackable marker of the array of trackable markers is configured to emit light that is modified by the first surface finish and the second surface finish of the cover panel and emerges from the outward facing surface for tracking by at least one tracking camera, and wherein the at least one trackable marker is disposed inboard of the cover panel.

17. The method of claim 16, wherein the at least one trackable marker comprises at least one light, and the cover panel is substantially opaque to visible light and substantially transparent to light wavelengths emitted by the at least one light.

18. The method of claim 16, wherein:
the constellation assembly is arranged on a head-mounted-display system that presents a virtual environment to a user; and
the light emitted by the at least one trackable marker is sensed by the at least one tracking camera to track the user's head movements.

19. The method of claim 16, wherein:
the constellation assembly is arranged on a controller that is configured to be held by a user for controlling a virtual environment presented by the virtual reality system; and
the at least one tracking camera tracks the user's hand movements by sensing the light emitted from the outward facing surface of the constellation assembly.

20. The tracking constellation of claim 1, wherein the at least one trackable marker is positioned within a recess in the cover panel.

* * * * *

UNITED STATES PATENT AND TRADEMARK OFFICE
CERTIFICATE OF CORRECTION

Page 1 of 1

PATENT NO.         : 10,712,813 B1
APPLICATION NO.    : 15/928121
DATED              : July 14, 2020
INVENTOR(S)        : Jared I. Drinkwater et al.

It is certified that error appears in the above-identified patent and that said Letters Patent is hereby corrected as shown below:

In the Claims

In Column 7, Line 11, Claim 8, delete "The tracking constellation of claim 1" and insert -- The tracking constellation assembly of claim 1 --, therefor.

In Column 7, Line 12, Claim 8, delete "is comprises" and insert -- comprises --, therefor.

In Column 8, Line 60, Claim 20, delete "The tracking constellation of claim 1" and insert -- The tracking constellation assembly of claim 1 --, therefor.

Signed and Sealed this
First Day of September, 2020

Andrei Iancu
*Director of the United States Patent and Trademark Office*